July 16, 1963 H. R. PFISTER 3,097,716
AUTOMATIC STEERING APPARATUS
Filed Feb. 17, 1955 5 Sheets-Sheet 1
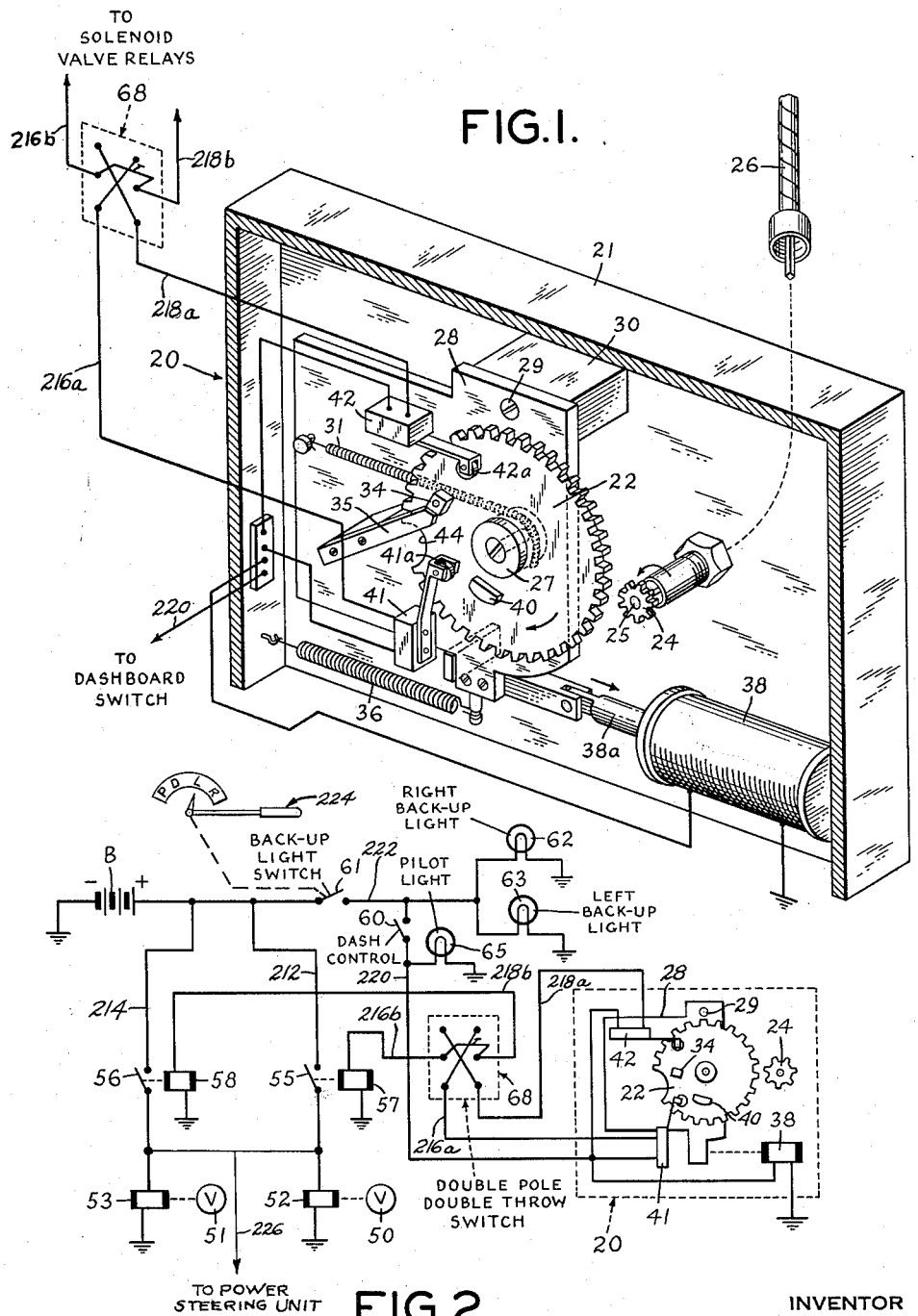
INVENTOR
HERBERT R. PFISTER
BY
Campbell, Brumbaugh, Free & Graves
HIS ATTORNEYS July 16, 1963 H. R. PFISTER 3,097,716
AUTOMATIC STEERING APPARATUS
Filed Feb. 17, 1955 5 Sheets-Sheet 2
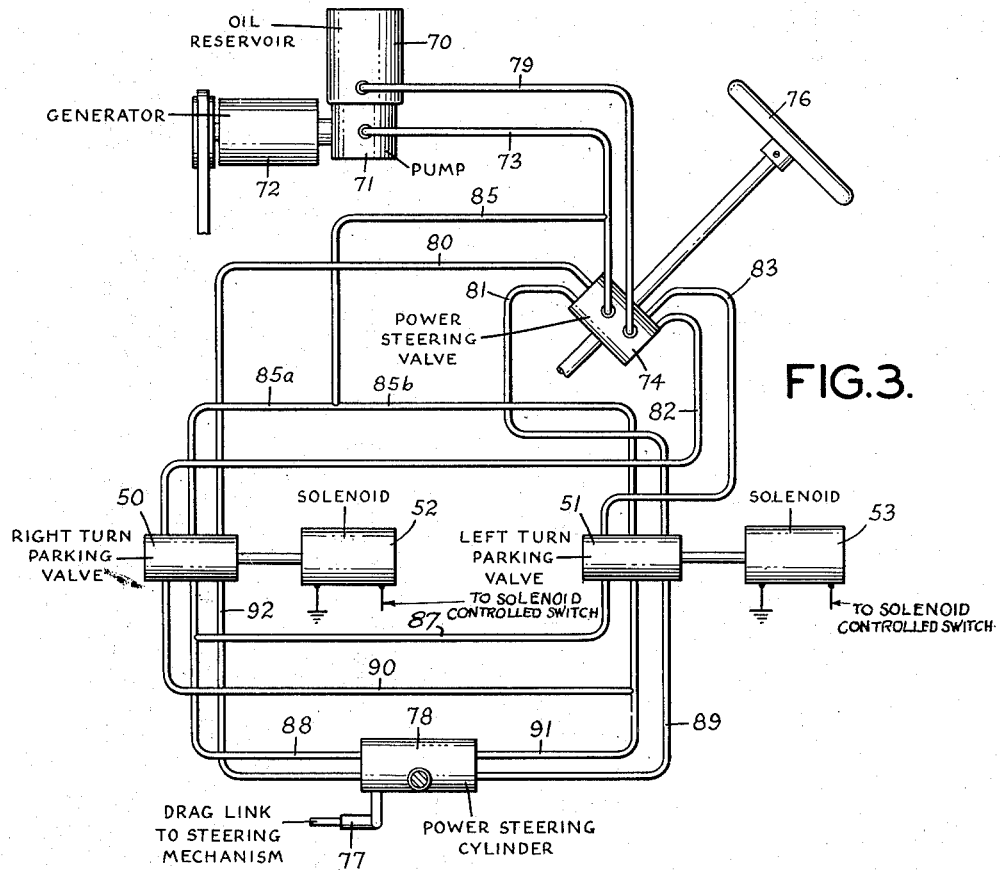
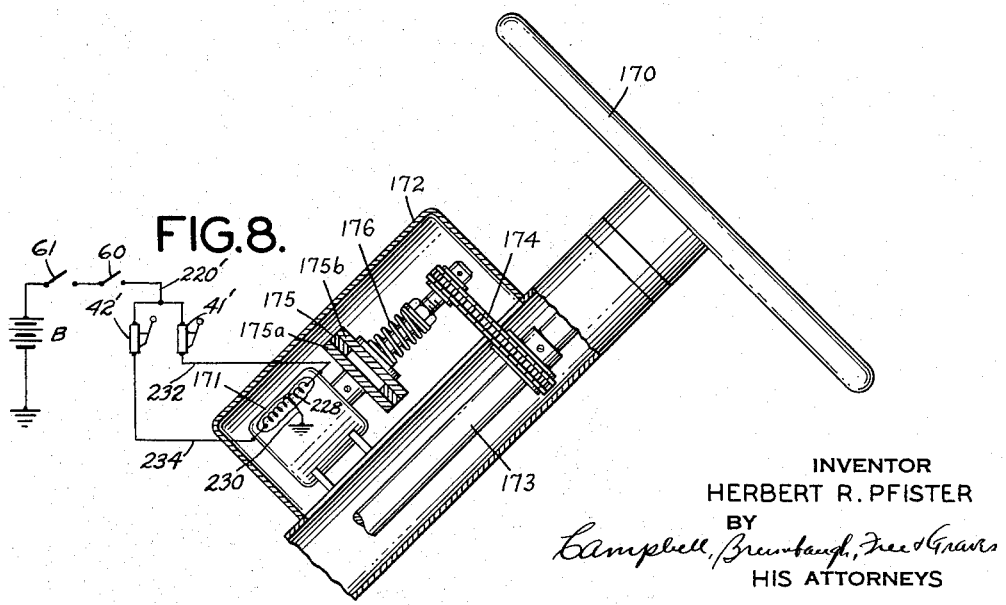
INVENTOR
HERBERT R. PFISTER
BY
HIS ATTORNEYS

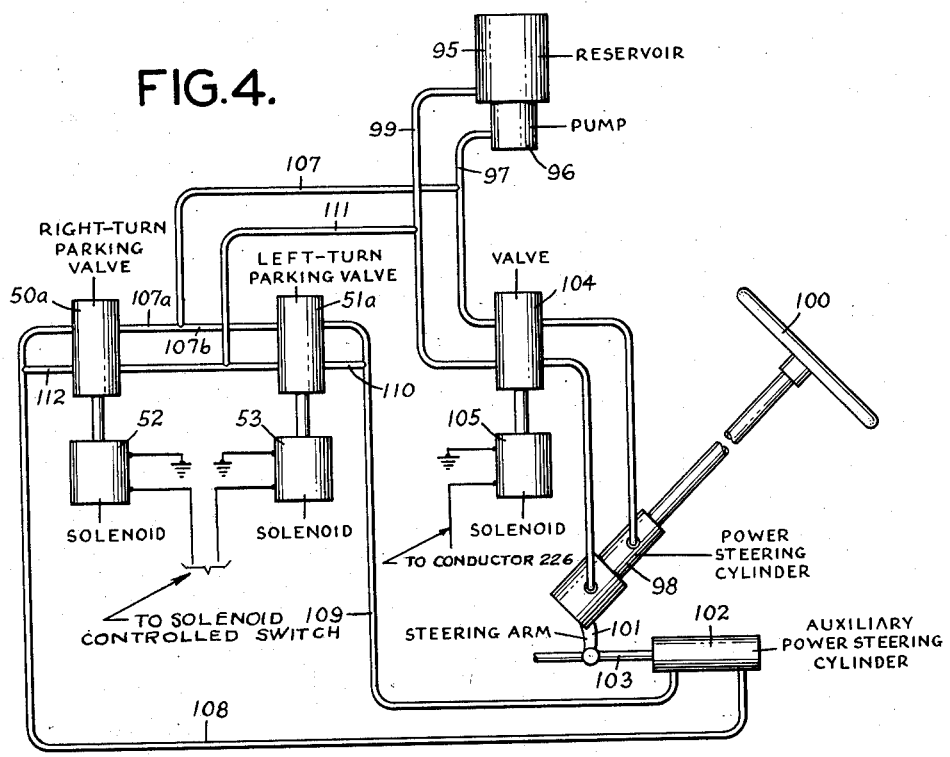

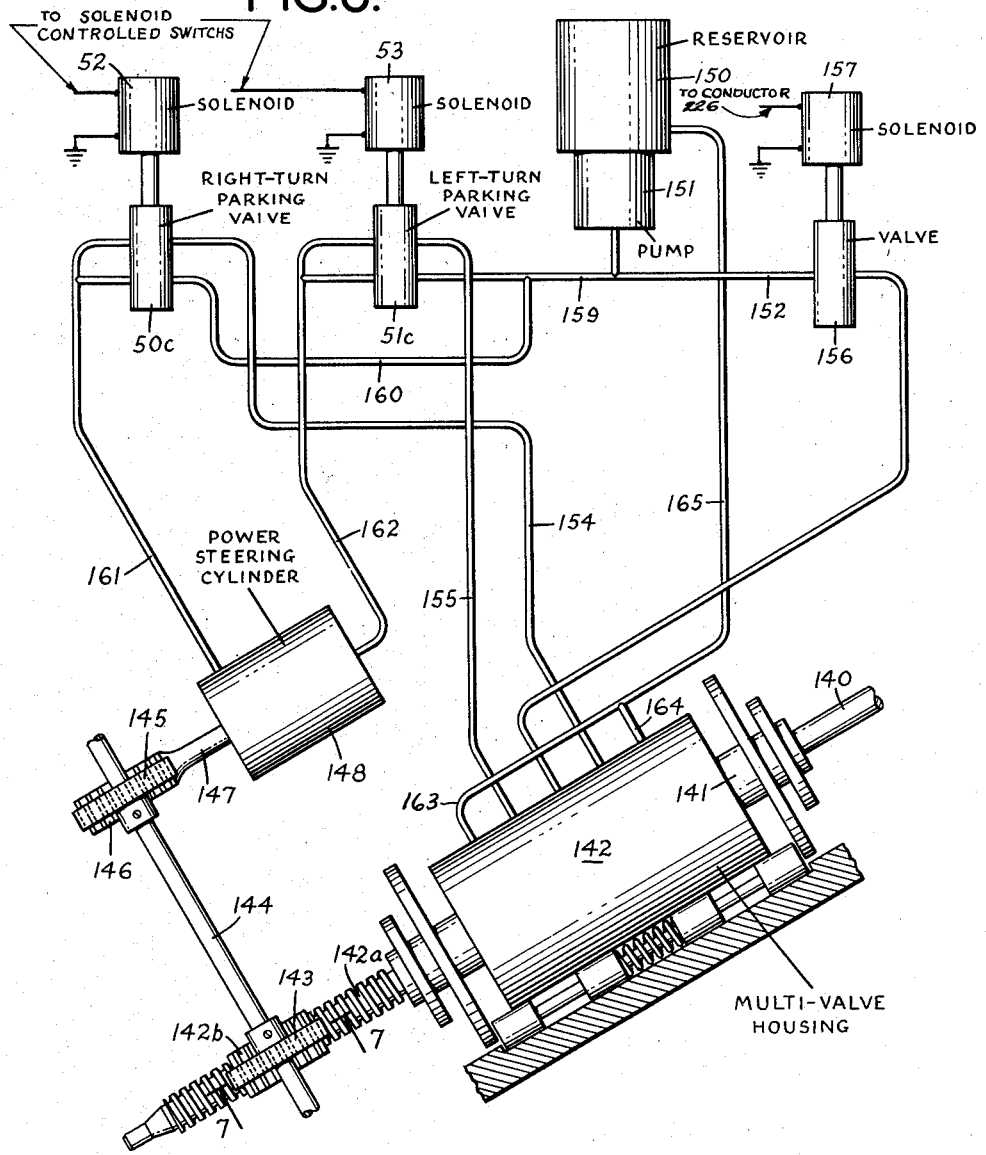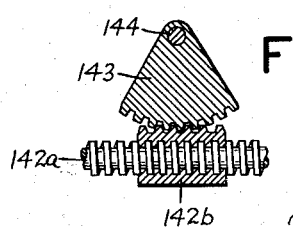

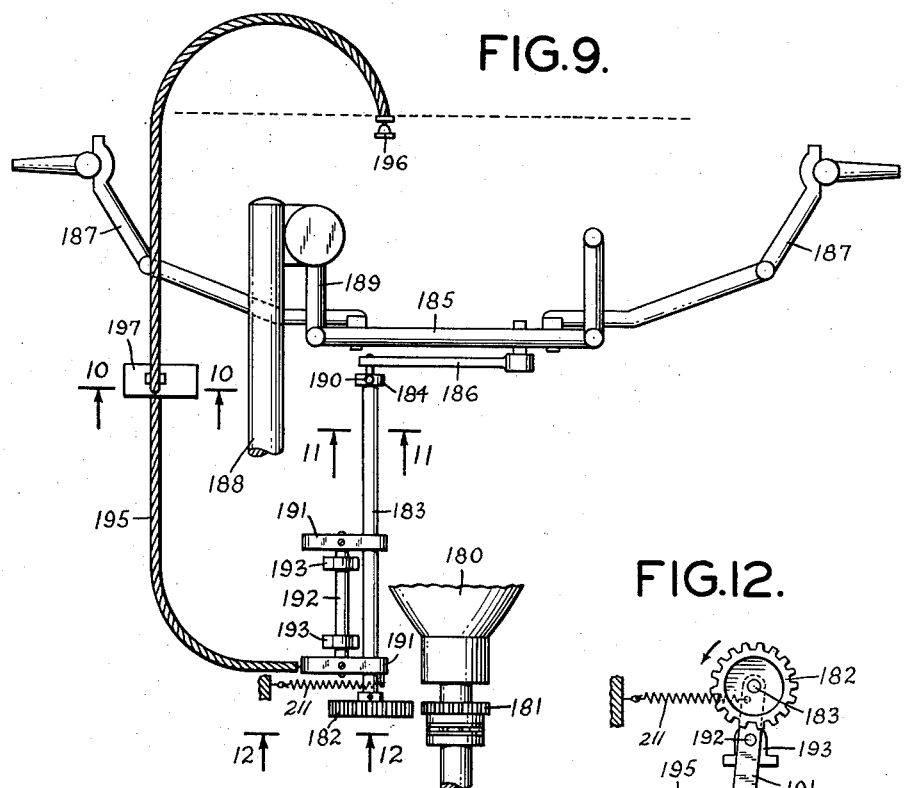
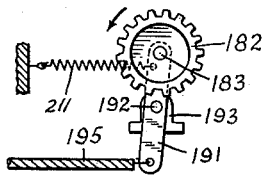
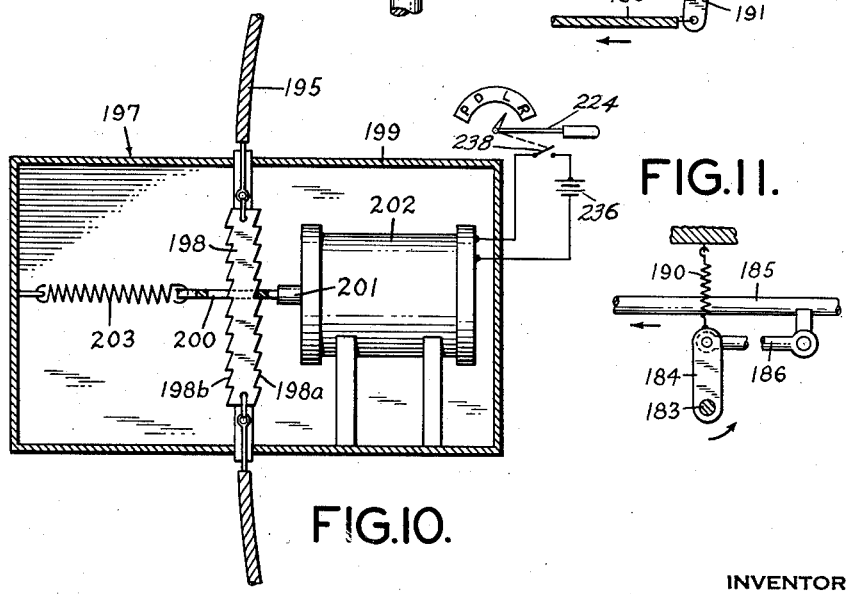

United States Patent Office 3,097,716
Patented July 16, 1963

3,097,716
AUTOMATIC STEERING APPARATUS
Herbert R. Pfister, Glen Cove, N.Y., assignor to General Motors Corporation, Detroit, Mich., a corporation of Delaware
Filed Feb. 17, 1955, Ser. No. 488,840
7 Claims. (Cl. 180—1)

This invention relates to apparatus for automatically regulating the steering mechanism of a vehicle to permit the vehicle to be backed into a parking space, for example, behind a parked car at the curb, without requiring the exercise of a high degree of effort, dexterity or judgment by the driver.

More particularly, apparatus of the present invention provides means for synchronizing the steering of the front wheels with the backward travel of the car to guide it into a parking space at a curb, relieving the driver of the responsibility of turning the steering wheel and judging the proper time to turn the wheel. The driver need only place the vehicle in a predetermined starting position, shift the drive selector to "reverse" and place the vehicle in motion in a rearward direction. Although the apparatus may be designed to execute the parking operation from any desired starting position, a position directly adjacent the car behind which it is desired to park has been found particularly convenient. During the rearward travel, the apparatus of the present invention will automatically control the direction of travel of the vehicle, turning the front wheels first in one direction and then, after a predetermined distance of travel, in the opposite direction to guide the vehicle into the parking space. When the vehicle is in the proper parked position, the operator need only stop the car to prevent unnecessary travel in the rearward direction. In this way, a perfect parking operation is assured and the maneuver is executed completely independently of the operator without requiring any physical exertion or exercise of judgment by him.

As a special safety feature of the present invention, the automatic parking apparatus is interlocked with the car's drive selector so that it is normally rendered inoperative, except when the drive selector is shifted to "reverse." As a consequence, even if the operator forgets to render the automatic parking apparatus inoperative after a parking operation, the vehicle may still be driven in a forward direction without the wheels turning automatically.

For a more complete understanding of the present invention, reference may be had to the detailed description which follows and to the accompanying drawings in which:

FIG. 1 is a perspective view of the preferred embodiment of the control apparatus of the present invention;

FIG. 2 is an electrical circuit diagram for the apparatus of the present invention;

FIG. 3 is a diagrammatic view illustrating the application of the present invention to one type of conventional steering system;

FIG. 4 is a diagrammatic view illustrating the application of the present invention to another type of conventional power steering system;

FIG. 5 is a diagrammatic view illustrating the application of the present invention to still another type of conventional power steering system;

FIG. 6 is a diagrammatic view illustrating the application of the present invention to a still further type of conventional power steering system;

FIG. 7 is a cross-section view taken on the line 7—7 of FIG. 6, looking in the direction of the arrows;

FIG. 8 is an elevation view, partly in cross section, of an alternative embodiment of the present invention wherein the automatic wheel turning operations are accomplished by the rotation of the steering wheel directly;

FIG. 9 is a plan view of an all mechanical embodiment of the present invention;

FIGS. 10, 11 and 12 are cross-section views taken on the lines 10—10, 11—11 and 12—12, respectively, of FIG. 9, looking in the direction of the arrows.

Referring to FIG. 1 of the drawings, in the preferred embodiment of the present invention the control unit, generally designated by the reference numeral 20, is enclosed within a housing or casing 21 which may be conveniently mounted beneath and behind the dashboard of an automobile; for example, it may be mounted to the firewall behind the dashboard. A large gear 22 and a small pinion 24 are housed within the casing 21. The small pinion 24 is supported on a shaft 25 within the housing, and the shaft is connected to the speedometer cable 26 and driven thereby. Another length of the speedometer cable (not shown) is connected from the shaft 25 to drive the speedometer so that the installation of the present invention does not deprive the vehicle of the benefit of the speedometer.

The large gear 22 is rotatably supported on a shaft 27 of a pivotal plate 28, and the plate is connected at its upper end by means of the pivot 29 to a block 30 attached to the back wall of the casing. A tension spring 31 is connected at one end to the plate and at its other end to the shaft 27, and the spring 31 normally urges the gear 22 in a counterclockwise direction, as viewed in FIGURE 1, so that the gear 22 is normally maintained in a "zero" position determined by the engagement of the stop 34 with the index finger 35.

The lower end of the pivtal arm 28 is acted upon by a tension spring 36 which normally maintains the gear 22 out of engagement with the pinion 24. The lower end of the pivotal arm 28, however, is also connected to the armature 38a of a solenoid 38, and when the solenoid 38 is energized, it overcomes the tension of the spring 36 and moves the gear 22 into mesh with the small pinion 24. When, therefore, the vehicle is moved in a rearward direction, the gear 22 and the pinion 24 will be driven in the direction of the arows in FIG. 1, and since the pinion 24 is driven by the speedometer cable, the rotation of the gears will be in direct proportion to the rearward travel of the vehicle.

One of the faces of the gear 22 carries a cam 40, and during the clockwise rotation of the gear 22, the cam 40 is moved into contact with the arm 41a of the microswitch 41, completing a circuit to turn the front wheels of the vehicle in the direction for a right turn. The continued movement of the cam 40 moves the cam into contact with the arm 42a of a microswitch 42, completing a circuit to turn the front wheels of the vehicle in the direction for a leftward turn. The cam 40 clears the end of the index finger 35, and the stop 34 moves in a plane adjacent the arms of the microswitches, which are mounted on the pivotal plate at a distance sufficient to clear the stop.

The gear 22 also carries on its periphery a recessed portion 44 which ultimately moves around to the pinion 24. Since the recessed portion 44 carries no teeth to engage with the pinion 24, the pinion merely idles while the large gear ceases to rotate. Thus, this recessed portion 44 serves as an overtravel gap to limit the rotation of the large gear to approximately a one-half turn, the entire parking operation taking place before the recessed portion 44 moves into position adjacent the rotating pinion 24.

The automatic control unit 20 described above is particularly applicable to hydraulic power steering systems, although the principle of the present invention is applicable to steering systems generally. A circuit diagram illustrating the application of the present invention to a hydraulic power steering system is contained in FIG. 2. Referring to that figure, the switches 41, 42 of the automatic unit 20 control the operation of valves 50, 51, respectively, in the hydraulic circuits of the steering system to turn the wheels to the right and to the left. The valves 50, 51 are controlled by solenoids 52, 53, respectively, and the power for energizing the solenoids 52 and 53 is supplied through separate conductors 212 and 214 from the battery B. A normaly open switch 55 controlled by a relay 57 establishes an electrical circuit to control the energization of solenoid 52, and a normally open switch 56 controlled by the relay 58 establishes an electrical circuit to control the energization of solenoid 53. The switches 41, 42 are, in turn, connected to control the operation of the relays 57, 58, by means of conductors 216a, 216b, and 218a, 218b, respectively, and a switch 68.

The electrical power for operating the relays 57, 58 and for operating the solenoid 38 is also obtained from the battery B via the conductor 220 which is interconnected with the battery B through a control switch 60. The control switch 60, thus, serves as a manual control and may be conveniently mounted on the dashboard of the vehicle. An auxiliary lead is provided by conductor 226 which is interconnected with both conductors 212 and 214 through switches 55 and 56 respectively and thereby with the positive terminal of battery B. The conductor 226 is, thus, energized simultaneously with the energization of either solenoid 52 or 53. Conductor 226 may be connected to energize any such further electrical equipment as may be required to adapt the present invention to a particular form of power steering unit. The utility of conductor 226 will be more particularly described with respect to FIGURES 4, 5 and 6.

As a safety feature to prevent the automatic control unit 20 from affecting the steering of the vehicle when the vehicle is moving in the forward direction, such as for example, when the control switch 60 has been inadvertently left closed, the control switch 60 is connected in series by means of conductor 222 with the conventional switch 61 which operates the backup lights 62, 63. In most cars equipped with reversing or backup lights, the switch 61 is closed automatically when the drive selector 224 is shifted to "reverse." This safety feature, therefore, insures that the automatic parking apparatus is rendered inoperative, except when the drive selector 224 is shifted to "reverse" position.

Summarizing the operation of the apparatus thus far described, when the vehicle is to be parked automatically, it may be pulled up evenly alongside a parked car behind which it is desired to park, the drive selector 224 moved to "reverse," thereby closing the switch 61, and the dash control switch 60 closed. The pilot light 65 will indicate that the automatic unit 20 is conditioned for operation. A circuit will also be established via conductor 220 to the solenoid 38 which will move the large gear 22 into mesh with the pinion 24.

As the vehicle is put into motion in the reverse direction, the rotation of the gear 22 will move the cam 40 into contact with the switch 41 to energize the relay 57 via conductors 216a and 216b. The relay 57 will close the switch 55 and establish a circuit to energize the solenoid 52 via conductor 212, thereby operating the control valve 50 to turn the wheels in a direction to guide the rear of the vehicle toward the curb. When the car has moved a predetermined distance, as determined by the length of the cam 40, the cam will move past the switch 41, and the circuit to the relay 57 will be broken.

After a predetermined movement of the vehicle, the cam 40 will close the switch 42, completing a circuit to the relay 58 via conductors 218a and 218b. The relay 58 closes the switch 56 and establishes a circuit to the solenoid 53 via conductor 214, and the solenoid 53 regulates the valve 51 to guide the front of the vehicle in the direction of the curb.

At the completion of the operation the vehicle will be properly spaced behind the front car adjacent the curb. Furthermore, the entire parking operation described requires no control by the operator beyond bringing the vehicle to the start position adjacent a parked car, initiating the reverse movement of the car and halting the car after the parking operation.

The sequence of operation of the switch relays 57, 58 is intended for parking adjacent a curb to the right, however, in some instances, such as when parking on a one-way street, it is desirable to park the vehicle adjacent a curb to the left. For this purpose, there is provided in the circuits between the switches 41, 42 and the relays 57, 58 a double pole, double throw reversing switch 68. When this switch is reversed, the microswitch 41 will control the operation of the relay 58 via conducotrs 216a and 218b. Similarly the microswitch 42 will control the relay 57 via conductors 218a and 216b, thus reversing the order of operation of the said relays.

FIGS. 3 to 7, inclusive, show the application of the present invention to certain commercial hydraulic steering power systems.

The application of the present invention to one form of a well known power steering system is shown in FIG. 3. The hydraulic fluid for the system is stored within a reservoir 70, and the fluid is supplied to the system under pressure by a pump 71 driven by the generator 72. The fluid is supplied to the cylinder 78 via a multiple valve housing 74, and the operation of the drag link 77 of the steering mechanism to turn the front wheels is controlled by the operation of a piston contained within the cylinder 78. In the conventional system, the path of the fluid through the multiple valve housing to the cylinder for a left or right turn is established by the direction of turn of the steering wheel 76. In the system as modified by the present invention, the path of flow of the fluid may also be determined by the special valves 50, 51 which, as described above, are controlled by the automatic control unit 20.

In the system as modified by the present invention, an additional conduit 85 having branches 85a and 85b has been added, the flow through the branch 85a being controlled by the valve 50 and the flow through the branch 85b being controlled by the valve 51. In normal operation, with the solenoids 52, 53 deenergized, the branch 85a is closed by the valve 50 and the branch 85b is closed by the valve 51. When the steering wheel 76 is in the straight-ahead position, all of the valves of the housing 74 are open, and oil circulates throughout the system without applying force to the piston. When the steering wheel is turned as for a right turn, the multi-valve housing will establish the flow of fluid from the reservoir through the conduit 73 to the conduit 83, through an open passageway in the valve 51, and through the lines 87 and 88 to the cylinder 78, thus moving the piston in the direction for a right-hand turn. The return flow of the fluid takes place through the line 89, an open passageway of the valve 51, the line 81 and the return line 79 to the reservoir. When, one the other hand, the wheel 76 is turned in the direction for a left turn, the flow of fluid takes place through the conduits 73 and 82, through an open passage of the valve 50, and thence through the lines 90 and 91 to the cylinder 78. The return flow takes place through the conduit 92, an open passage of the valve 50, the line 80 and thence through an open valve of the housing 74 to the return line 79.

Assuming, however, that the right turn parking valve 50 has been operated by the energization of the solenoid 52, then the fluid will follow a path through the conduits 73, 85 and 85a, through an open passage of the valve 50, and thence through the conduit 88 to the cylinder 78, turning the wheels to the right. The return flow will follow a path through the line 89, an open passage of the valve 51, the line 81, an open passage of the valve housing 74 and the line 79 to the reservoir 70. When the left turn solenoid 53 is energized, a flow of fluid will occur through the lines 73, 85, 85b, through an open passage of the valve 51 and through the line 91 to the cylinder 78, turning the wheels to the left.

FIG. 4 illustrates the appliction of the present invention to another form of a well known power steering system. In this system the fluid is supplied in normal operation under pressure by a pump 96 through the line 97 to the power steering cylinder 98 and returned via the line 99 to the reservoir. The turning of the steering wheel 100 in one direction or the other aided by the hydraulic pressure moves the steering arm 101, and the arm 101 controls the desired steering movement.

According to the present invention an auxiliary power cylinder 102 is added to the basic power steering arrangement, and the piston of the auxiliary cylinder is connected to the steering arm 101 by means of link 103 so that the steering mechanism can also be controlled by the piston of the auxiliary cylinder. A valve 104 actuated by a solenoid 105 is added to prevent the flow of fluid through the lines 97, 99, when the automatic parking apparatus is in operation. The solenoid 105 is connected to conductor 226 shown in FIGURE 2 such that closure of either of the switches 55 or 56 is effective to energize solenoid 105..

In this system when the right turn solenoid 52 is energized, the flow of fluid will follow a path through the conduits 97, 107 and 107a, an open passage of the valve 50a and through the conduit 108 to the auxiliary power steering cylinder 102. The return flow will be from the cylinder 102 via the conduits 109 and 110, through an open passage of the valve 51a and via the return lines 111 and 99 to the reservoir 95. When the solenoid 53 is energized, the flow will take place through the lines 97 and 107b, an open passage of the valve 51a and the conduit 109 to the cylinder 102. The return flow will follow the path through the conduits 108, 112, an open passage of the valve 50a, and through the conduits 111 and 99 to the reservoir 95.

Oil trapped in the auxiliary power cylinder circulates and recirculates through the parking valves 50a and 51a and conduits 108 and 109 as movement of the steering arm during normal steering causes the auxiliary power piston to move back and forth in the cylinder. This dash-pot effect of the cylinder 102 should smooth out the power steering action by adding to the feel of the steering wheel and by cushioning road shocks before they reach the power steering unit.

FIG. 5 shows the application of the present invention to still another form of a well known power steering system. In ordinary operation in this system, a fluid is supplied from the reservoir 115 by means of the pump 116 through the conduit 117 to the power steering cylinder 118, and the fluid is returned to the reservoir via the line 119. The steering arm 120 is connected to the cylinder 118, and the cylinder 118 is movable with respect to its piston, the piston rod 121 being anchored to a stationary frame 122. The cylinder is connected by means of the rods 123 to the steering mechanism of the vehicle. In this way the hydraulic pressure assists the movement of the cylinder 118 by the steering arm. As in the system described above in connection with FIG. 4, a valve 125 actuated by a solenoid 126 is necessary to divert the flow of fluid to the parking valves and to close the flow of fluid through its normal path to the power steering cylinder 118. Thus, the solenoid 126 may be connected to conductor 226 of FIGURE 2 as suggested in the drawing.

In this system when the solenoid 52 is energized, the flow of fluid will take place through the lines 128, 128a, an open passage of the valve 50b, and the conduit 129 to the cylinder 118. The return flow occurs through the line 130, an open passage of the valve 51b, the conduit 131, an open passage of the cylinder 118 to the conduits 132 and 119, and thence via the line 119 to the reservoir. When the solenoid 53 is energized, the flow will take place through the lines 128, 128b, an open passage of the valve 51b and the line 130 to the cylinder 118, and the return flow will take place through the line 129, an open passage of the valve 50b, conduit 134, an open passageway of the cylinder 118 to the return lines 132, 119 and thence through the passage 119 to the reservoir 115.

FIGS. 6 and 7 represent the present invention as applied to a still further form of a well known system. In this system, the steering wheel of the vehicle (not shown) is connected by means of a shaft 140 to a spool 141 axially disposed within the multi-valve housing 142. The end of the spool 141 carries a threaded worm 142a and the worm carries a rider 142b which is guided for axial movement along the worm when the latter is rotated. The upper surface of the rider 142b is formed with teeth which are in mesh with a gear segment 143 mounted at one end of a transverse shaft 144. Another segment 145 is mounted at the other end of the shaft 144, and the segment 145 engages with a rack 146 which is connected by means of the rod 147 to the piston of a power steering cylinder 148. The shaft 144 is connected to the steering mechanism of the vehicle so that the rotation of the shaft controls the turning of the front wheels.

In the conventional system, as the steering wheel is turned, the worm 142a will rotate about its axis. This rotation would normally move the rider along the worm were it not for the resistance of the wheels to turn, as reflected in the resistance of the shaft 144 to rotate. Consequently, the rider 142b serves initially as a bearing for the worm, causing it to move axially and set up a path of flow through the multi-valve housing to the piston, however, once the initial resistance of the wheels to turn is overcome, the rider will be free to move relative to the work. The hydraulic system through the piston will supply the necessary power for rotating the shaft 144. This very briefly describes the operation of the still further form of the well known power steering system.

In the system as modified by the present invention, the control of the steering wheel will establish, just as in the conventional system, a path for the circulation of the fluid by the pump 151 from the reservoir 150, through the line 152, an open passage of the multi-valve housing 142, thence through either the conduit 154 and 161 or 155 and 162 to the cylinder 148, according to which direction the steering wheel has been turned. When the automatic parking apparatus is in operation, however, a valve 156 actuated by the energization of the solenoid 157 is closed to prevent the flow of fluid through the conduit 152. Like the solenoids 105 and 126 in the systems of FIGS. 4 and 5, respectively, the solenoid 157 is energized by battery B of FIGURE 2 upon closure of either of the switches 55 or 56. When, therefore, the solenoid 52 is energized, the flow of fluid will be from the pump 151 through the lines 159 and 160, through an open passage of the valve 50c and thence through the line 161 to the power steering cylinder 148. The return flow will follow a path through the conduit 162, an open passage of the valve 51c, the conduit 155, an open passage in the multi-valve housing 142, thence through the lines 163 and 164 to the return line 165. When the solenoid 53 is energized, the flow will take place through the line 159, an open passage of the valve 51c and the line 162 to the cylinder 148. The return passage of the fluid will be through the conduit 161, an open passage of the valve 50c, the conduit 154, a passage through the housing 142, the conduits 163 and 164, and finally the conduit 165 to the reservoir 150.

Thus far the invention has been described as applied to vehicles equipped with hydraulic power steering systems. It is evident, however, that the present invention is applicable to vehicles generally, regardless of their articular type of steering mechanism. For example, FIG. 8 of the drawings illustrates apparatus for automatically controlling the turning of the steering wheel 170 by means of a reversible motor 171 having a field winding 228 which is centrally grounded as indicated at 230. In this arrangement the switches 41, 42 of the control unit 20 are replaced by switches 41' and 42' which are adapted to be closed by the control unit 20 in the same manner as previously described. Each of the switches 41' and 42' is interconnected with the battery B via switches 60 and 61 and conductor 220'. Additionally, switch 41' is connected to one side of winding 228 via conductor 232 to apply a voltage across the winding in one direction when switch 41' is closed. Switch 42' is connected to the other side of winding 228 via conductor 234 to apply a voltage across the winding in the opposite direction. In this manner the motor 171 is made to run in opposite directions by the closure of respective ones of the switches 41' and 42'.

The motor 171 may be mounted on the steering column housing within a casing 172, and the motor may be connected to the steering wheel shaft 173 by means of a chain and sprocket drive transmission 174 and a friction clutch 175. The driving and driven elements 175a, 175b of the friction clutch are held in frictional engagement by a compression spring 176, and the spring pressure provides sufficient frictional contact between the driving and driven members to turn the steering wheel in one direction or the other, while permitting the clutch to slip when the steering wheel has been turned to an extreme position. The spring engagement of the clutch elements also permits the driver to overcome the automatic turning operation of the steering wheel if he so desires.

FIGS. 9 to 12 illustrate an all mechanical embodiment of the present invention which is applicable to all vehicles whether equipped with power steering or not. In this embodiment the power for turning the wheels is supplied from the transmission 180 of the vehicle by a drive gear 181. A gear 182 normally out of engagement with the gear 181 is carried at the end of a fore-and-aft shaft 183, and the forward end of the shaft 183 carries an arm 184 which is connected to the tie rod 185 of the steering mechanism by means of a link 186. The tie rod 185 is connected to the steering knuckles 187 of the steering mechanism in the usual manner. The steering column 188 is also connected to the end of the tie rod 185 by means of a conventional linkage 189. The arm 184 is normally maintained in approximately a vertical upstanding position by means of a tension spring 190.

The shaft 183 is supported by arms 191 fixed to a common rod or shaft 192 rotatably supported in bearing blocks 193, and the rotation of the shaft 192 will move the gear 182 into and out of mesh with the gear 181.

The pivotal rotation of the shaft 192 to translate the shaft 183 laterally in order to swing the gear 182 into engagement with the drive gear 181 is accomplished by the axial movement of a flexible cable 195 controlled from a handle 196 conveniently located in the vicinity of the dashboard of the vehicle. When thus actuated the cable 195 is held in operative position by a safety lock device 197 which prevents slippage of the cable 195, thereby maintaining the gear 182 in mesh with the drive gear 181.

As the car is moved backwards, the gear 181 rotates the shaft 183, moving the arm 184 at the extreme forward end of the shaft 183 in a counterclockwise direction, as indicated by the arrow in FIG. 11. As the eccentric arm 184 rotates from its more or less upright position, the resulting movement of the tie rod turns the wheels to the right to guide the rear of the vehicle toward the curb. The arm 184 continues its rotation toward a 9 o'clock position which represents the extreme leftward position of the tie rod 185. Thereafter the continued rotation of the eccentric arm 184 reverses the movement of the tie rod 185, the wheels being returned to a straight ahead position at the six o'clock position and turned to the left to guide the front end of the vehicle toward the curb as it approaches the three o'clock position. By controlling the ratio of the gears 181, 182, and by choosing an eccentric arm 184 of the desired length, the necessary turning effect can be achieved to permit the vehicle to be parked automatically.

At the completion of the parking operation, the locking mechanism 197 is released by shifting the drive selector out of "reverse" and the control knob 196 may be operated to disengage the gears 181, 182. A spring 211 connected to one of the arms 191 will maintain the gear 182 out of engagement with the gear 181. Furthermore, the spring 190 will urge the eccentric arm into an upward position while it follows the movements of the tie rod during normal steering.

It may be parenthetically mentioned at this point that the drive may be established between the gears 181, 182 by shifting an idler gear. This would make it unnecessary to shift the shaft 183. An idler gear would reverse the rotation of shaft 183, however, if spring 190 exerted a downward pull, arm 184 would start at a 6 o'clock position, move to a 9 o'clock position (turning wheels right), then on to a 12 o'clock position (straight ahead), then to a 3 o'clock position (turning wheels left), completing the parking operation as originally outlined.

FIG. 10 illustrates the safety lock mechanism 197 which comprises a member 198 mounted for slidable movement within a housing 199 and a solenoid operated locking member 200. The member 198 is connected to the cable 195 and forms an intermediate portion thereof and the member extends through a slot of the locking member 200. Teeth 198a are formed along one edge of the member 198, and teeth 198b are formed along the other edge. The locking member 200 is connected to the armature 201 of a solenoid 202 and the opposite end of the armature is connected to a tension spring 203. Normally the locking member is urged by the spring 203 to the position shown in the drawings, that is to say, with the locking member 200 in operative engagement with the upwardly facing teeth 198a. In this position the locking member 200 will prevent the upward movement of the cable 195, thereby preventing the automatic parking apparatus from being rendered operative. The solenoid 202, however, is interconnected with a battery 236 via a switch 238 which is adapted to be closed by shifting the drive selector 224 to "reverse," thereby shifting the locking member 200 so that the opposite operative edge of the slot will engage the downwardly facing teeth 198b. In this position the locking member 200 will not resist the operation of the control knob 196 in the operative direction, but, once operated, it will resist the release thereof until the solenoid 202 is deenergized by shifting the drive selector 224 out of "reverse" position. In this way the locking mechanism 197 serves as a very effective safety device to prevent the automatic parking apparatus from being actuated accidentally, and at the same time, preventing accidental release of the automatic parking apparatus once rendered operative.

The invention has been shown in preferred forms and by way of example, and obviously many modifications and variations may be made therein without departing from the spirit of the invention. It is understood, however, that the invention is not to be limited to any specified form or embodiment except in so far as such limitations are set forth in the appended claims.

I claim:

1. In a system for automatically operating the steering mechanism of a vehicle equipped with an hydraulic power steering system to permit the vehicle to be backed into a parking space, wherein the hydraulic system includes first and second fluid circuits operable to turn the wheels of the vehicle in respectively opposite directions; the combination of a first solenoid operated valve operable to establish the first fluid circuit to turn the wheels of the vehicle in one direction, a second solenoid operated valve operable to establish the second fluid circuit to turn the wheels in the opposite direction, first and second solenoids respectively interconnected with the first and second valves and energizable to operate the valves, electrical circuits to energize each of the solenoids, a source of electrical power, switches in each of said electrical circuits to establish the flow of current from the electrical power source to the solenoids, driving means, driven means, means carried by said driven means to operate said switches in succession, said driving means and said driven means being normally out of operative engagement, a third solenoid for establishing the operative connection between said driving means and said driven means, and a manually controlled switch for establishing an electrical circuit to the third solenoid to establish the operative connection.

2. A system as set forth in claim 1 including a drive selector for controlling the operation of a vehicle transmission, and a normally open switch connected to the selector to be closed when the drive selector of the vehicle is moved to a position to back up the vehicle, said switch being in series with the manually controlled switch so that the automatic operation of the steering mechanism can be initiated only when the selector is in said position.

3. Apparatus as set forth in claim 1 including switching means for reversing the order of operation of the solenoids which control the operation of the valves to permit the vehicle to be parked in a space on the opposite side of the vehicle.

4. In a system for automatically operating the steering mechanism of a vehicle to permit the vehicle to be backed into a parking space, the combination of a source of fluid pressure, means connecting said source of pressure and said steering mechanism and including valve means, solenoid means to operate said valve means for establishing a fluid circuit to turn the wheels of the vehicle in one direction and to establish a fluid circuit to turn the wheels in the opposite direction, electrical circuit means to energize said solenoid means, a source of electrical power, switch means in said electrical circuit means to establish the flow of current from the electrical power source to the solenoid means, driving means, driven means, means carried by said driven means to operate said switch means to effect predetermined operation of the solenoid means and the valve means thereby, said driving means and said driven means being normally out of operative engagement, means for establishing the operative connection between said driving means and said driven means, and a manually controlled means for energizing said last named means to establish said operative connection.

5. In a system for automatically operating the steering mechanism of a vehicle to accomplish a predetermined maneuver, said vehicle being equipped with a fluid pressure generator and a fluid power steering gear including a fluid motor operably connected to such mechanism and a valve for controlling fluid flow to and from said motor, the combination of auxiliary valve means in fluid circuit between said motor and said generator, a source of electric power carried by the vehicle, solenoid means in circuit with said source of electric power for operating said auxiliary valve means, cam means controlling the operation of said solenoid means through switches in said last circuit, said cam means being constructed as dictated by the particular maneuver, and disengageable means for driving said cam means during the maneuver through a distance bearing a fixed ratio to the displacements of the vehicle.

6. Apparatus for automatically aligning the dirigible wheels of a vehicle equipped with hydraulic power steering equipment to permit the vehicle to be maneuvered into a parking space comprising: first and second fluid circuits establishable to operate the steering equipment to move the dirigible wheels in respectively opposite directions to guide the vehicle into the parking space; first and second valves included in the first and second fluid circuits, respectively, and effective to establish the fluid circuits in accordance with the condition of the valves; first and second solenoids respectively interconnected with the first and second valves and effective to condition the valves to establish the fluid circuits in accordance with the energization of the solenoids; first and second electrical switches respectively interconnected with the first and second solenoids and adapted to control the energization thereof; a driving member; a driven member; and means carried by the driven member to operate the first and second switches in succession.

7. Apparatus as defined by claim 6 wherein the driven member is normally out of operative engagement with the driving member; the combination including means actuable by the operation of the vehicle to establish the operative engagement between the driving and driven members.

References Cited in the file of this patent
UNITED STATES PATENTS

| | | |
|---|---|---|
| 2,424,288 | Severy | July 22, 1947 |
| 2,588,815 | Fasolino | Mar. 11, 1952 |
| 2,720,275 | Thayer | Oct. 11, 1955 |
| 2,736,015 | Gilvarry et al. | Feb. 21, 1956 |